Feb. 2, 1960  E. HORMANN  2,923,807
PROCESS FOR CONTINUOUSLY MANUFACTURING TUBES
Filed April 15, 1957
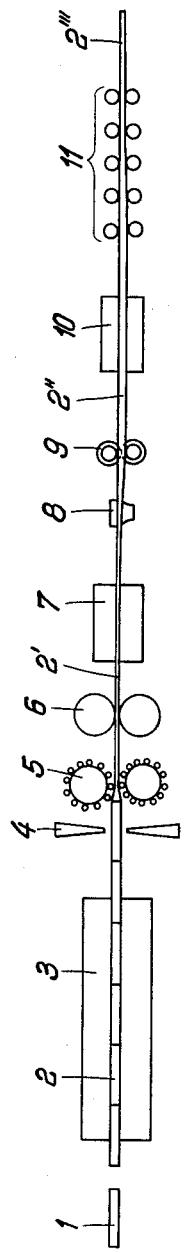
Inventor:
Erich Hörmann
by: Michael S. Striker
agt.

United States Patent Office 2,923,807
Patented Feb. 2, 1960

2,923,807

PROCESS FOR CONTINUOUSLY MANUFACTURING TUBES

Erich Hormann, Dusseldorf-Eller, Germany, assignor to Firma Phoenix-Rheinrohr A.G., Vereingte Hutten- und Rohrenwerke, Dusseldorf, Germany Application April 15, 1957, Serial No. 652,742

Claims priority, application Germany April 13, 1956

4 Claims. (Cl. 219—67)

The present invention relates to a process for continuously manufacturing tubes having a continuous longitudinal seam at the joined edges of a band from which the tube is formed.

Up to the present time tubes of this type have been continuously manufactured from bands especially formed for the manufacture of such tubes. The use of such bands for the manufacture of tubes of this type has many drawbacks specifically referred to below.

It is thus a primary object of the present invention to provide a process, for continuously manufacturing tubes of the above type, which is far superior to hitherto known processes and which in particular eliminates the disadvantages flowing from the use of a previously manufactured band from which the tube is manufactured.

With this and other objects in view, the present invention mainly consists of a process for continuously manufacturing a tube, this process including the steps of continuously welding together in end to end relation a plurality of elongated blocks so that in this way an elongated bar is continuously formed. This elongated bar is continuously moved longitudinally and is continuously heated to a temperature suitable for hot rolling, after which the bar is continuously hot rolled to have its thickness substantially reduced, so as to form a band. This band is then formed into a tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The process of the present invention may be used with any desired materials such as ferrous metals or the like or alloys thereof which include copper or the like.

Referring to the drawing, the first step of the process involves the continuous manufacturing of a bar 2 from blocks 1. These blocks 1 may be in the form of any suitable billets, blooms or ingots, and in accordance with the present invention these elongated blocks 1 have a thickness of approximately 20–50 times the wall thickness of the finished tube. For example, each block 1 may have a length of 10,000 mm., a width of 300 mm. and a thickness of 50 mm. These blocks are welded together in end to end relation so as to continuously form the bar 2 shown in the drawing, this bar 2 continuously moving longitudinally through an oven 3, as is diagrammatically shown in the drawing. As the left end of the bar 2, as viewed in the drawing, moves toward the entrance end of the oven 3 another block 1 is welded thereto, and so on, so that in this way the bar 2 is being continuously formed as it continuously moves through the oven 3 to be continuously heated therein. In the case of ferrous metals, the bar 2 is heated in the oven 3 in such a way that it leaves the oven at a temperature of approximately 1,000° C.

Next to the discharge end of the oven there is an installation 4 which directs water under pressure against the heated bar 2 so as to descale the latter, and immediately after descaling the continuously moving bar 2 is hot rolled in a planetary rolling mill 5 shown diagrammatically in the drawing. During the hot rolling the thickness of the bar is reduced so that the bar which originally had a width of 300 mm. and a thickness of 50 mm. has a width of 300 mm. and a thickness of approximately 3–5 mm. In accordance with the present invention the thickness of the bar is reduced by the hot rolling thereof to such an extent that when the bar leaves the rolling mill it has a thickness of approximately $\frac{1}{10}$–$\frac{1}{20}$ of the thickness of the bar leaving the oven 3. The bar 2 enters the rolling mill at a temperature of approximately 980° C., in the example where it leaves the oven with a temperature of approximately 1,000° C., and in the rolling mill the temperature of the bar is increased by approximately 80° C. due to the working of the bar.

The bar of reduced thickness forms the band indicated at 2', and this continuously moving band 2' moves through a polishing structure 6 shown diagrammatically, this polishing structure 6 smoothing the outer surface of the bar. If desired, the band can at this time also be treated by suitable tools so as to be provided with a very accurately determined cross sectional configuration.

The continuously moving band 2', after leaving the polishing installation 6, moves continuously through an electro-induction heating device 7 of known construction shown diagrammatically in the drawing, and in this electro-induction heating device the opposed side edges of the band 2' are heated so as to be brought to a temperature suitable for welding thereof, which is to say a temperature at which these edges will flow into each other. The heat applied by the electro-induction heater 7 to a continuously moving band extends into the bar from each of its outer side edges through a distance which at a maximum is but a few millimeters.

Immediately after leaving the induction heater 7, the band moves into a tube welding installation which includes the pair of rolls 8 which transversely curve the band about an axis parallel to the band so as to cause the opposite side edges of the band to become located closely adjacent to each other. This tube welding installation includes a pair of subsequent rolls 9 which push the heated side edges of the band together so that they become welded to each other and thus the installations 8, 9 form thhe tube 2".

Then, the thus-formed tube 2" continuously moves from the installations 8, 9 through another oven 10, preferably an electro-induction oven, in which the tube, whose temperature has in the meantime dropped, is again heated to a temperature of approximately 950–1,000° C. After leaving the oven 10 the tube is continuously moved through a drawing and reducing installation 11, shown diagrammatically in the drawing, and in this latter installation the tube 2" has its dimensions changed to form the final tube 2'''.

The above-described process of the invention provides many advantages over hitherto known processes for forming tubes of this type. Inasmuch as the heating in the oven 3 need only take place up to a temperature of approximately 1,000° C., it is not possible for copper included in the material of the bar to become concentrated at the edges thereof. Such a concentration of copper generally renders welding together of the side edges of the band extremely difficult to carry out.

In particular, it is only necessary to heat the bar 2 once up to 1,000° C., as distinguished from the necessity of known processes where blocks are heated to 1250° C. and where a rolled band is heated to 1350° C. Not only does the process of the invention save a considerable amount of energy, but because of the much smaller scale loss there is a considerable saving of material.

The winding and unwinding of a band especially manufactured to form a tube of the above type, as is known in conventional processes, is completely unnecessary with the process of the present invention, and this winding and unwinding of a band carries along with it several disadvatages. Thus, with a band which must be wound and unwound it is necessary to cut off and dispose of a considerable amount of end portions of the band. Moreover, the edges of such a band are easily damaged, and because of non-uniform cooling such bands become undesirably deformed and as a result do not move easily into the structure for welding together the edges of the band. Furthermore, with such a band the outer surfaces thereof are hard to keep clean and in fact they usually are not clean, and difficulties are always encountered when such a band is first introduced into the apparatus for continuously forming a tube.

A particularly great advantage of the present invention resides in the fact that it provides a much more favorable heat balance than hitherto known processes.

It will be understood that each of the elements described above, or two or more together, may also find a useful application in other types of tube manufacturing processes differing from the types described above.

While the invention has been illustrated and described as embodied in continuous tube manufacturing processes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A process for continuously manufacturing ferrous tubing having a copper content capable of migrating to edges to be welded when subjected to conventional hot rolling temperatures, comprising the steps of continuously welding together in end to end relation a plurality of blocks each having a thickness approximately 20–50 times greater than the thickness of the wall of the finished tube, so as to continuously form an elongated bar from said blocks; continuously moving said bar longitudinally; continuously heating the longitudinally moving bar to a temperature of only approximately 1,000° C.; continuously hot rolling the thus-heated bar and reducing the thickness thereof during hot rolling in a single pass to a thickness approximately $1/10$ to $1/20$ of the thickness of the bar before hot rolling thereof, so as to form a band from said bar; continuously heating longitudinal strip portions of a width of only few millimeters and extending respectively along the opposed side edges of the longitudinally moving band to a welding temperature; then continuously curving the band transversely about an axis parallel thereto into a tubular configuration and continuously welding together the thus-heated edges thereof so as to form a tube; continuously heating the thus-formed, longitudinally moving tube; and then continuously drawing the tube and reducing the size thereof to the final dimensions of the tube.

2. A process for continuously manufacturing a tube, comprising the steps of continuously joining together in end to end relation a plurality of elongated blocks each of which has a thickness of approximately 20–50 times the wall thickness of the finished tube, so as to continuously form an elongated bar from said blocks; continuously moving the elongated bar longitudinally; continuously heating the moving bar to a temperature of only approximately 1,000° C.; continuously hot rolling the thus-heated bar and reducing the thickness thereof during hot rolling in a single pass through a planetary mill to $1/10$–$1/20$ of its original thickness to form a band therefrom; continuously heating longitudinal strip portions of a width of only few millimeters and extending respectively along the opposite side edges of the longitudinally moving band electro-inductively to a temperature suitable for welding together of the opposite side edges of the band; continuously curving the band transversely about an axis parallel thereto and continuously welding together the thus-heated edges thereof so as to continuously form a tube; continuously electro-inductively heating the thus-formed tube; and then continuously drawing and reducing the latter tube to the dimensions of the final tube.

3. A process for continuously manufacturing ferrous tubing having a copper content capable of migrating to edges to be welded when subjected to conventional hot rolling temperatures, comprising the steps of continuously welding together in end to end relation a plurality of blocks each having a thickness approximately 20–50 times greater than the thickness of the wall of the finished tube so as to continuously form an elongated bar from said blocks; continuously moving said bar longitudinally; continuously heating the longitudinally moving bar to a temperature of only approximately 1,000° C.; continuously hot rolling the thus-heated bar and reducing the thickness thereof during hot rolling in a single pass through a single planetary rolling mill to a thickness approximately $1/10$ to $1/20$ of the thickness of the bar before hot rolling thereof, so as to form a band from said bar; continuously heating longitudinal strip portions of a witdh of only few millimeters and extending respectively along the opposed side edges of the longitudinally moving band to a welding temperature; then continuously curving the band transversely about an axis parallel thereto into a tubular configuration and continuously welding together the thus-heated edges thereof so as to form a tube; continuously heating the thus-formed, longitudinally moving tube; and then continuously drawing the tube and reducing the size thereof to the final dimensions of the tube.

4. A process for continuously manufacturing ferrous tubing having a copper content capable of migrating to edges to be welded when subjected to conventional hot rolling temperatures, comprising the steps of continuously welding together in end to end relation a plurality of blocks of ferrous material containing a small percentage of copper and each having a thickness approximately 20–50 times greater than the thickness of the wall of the finished tube so as to continuously form an elongated bar from said blocks; continuously moving said bar longitudinally; continuously heating the longitudinally moving bar to a temperature of only approximately 1,000° C.; continuously hot rolling the thus-heated bar and reducing the thickness thereof during hot rolling in a single pass to a thickness approximately $1/10$ to $1/20$ of the thickness of the bar before hot rolling thereof so as to form a band from said bar, whereby during said hot rolling in a single pass the temperature of the material is only slightly raised above the temperature of 1,000° C. to which the bar is heated before rolling so that the copper included in the material will not become concentrated on the surface thereof; continuously heating longitudinal strip portions of a width of only few millimeters and extending respectively along the opposed side edges of the longitudinally moving band to a welding temperature; then continuously curving the band transversely about an axis parallel thereto into a tubular configuration and continuously welding together the thus-heated edges thereof so as to form a tube; continuously heating the thus-formed, longitudinally moving tube; and then continuously drawing the tube and reducing the size thereof to the final dimensions of the tube.

References Cited in the file of this patent

UNITED STATES PATENTS

| | | |
|---|---|---|
| 1,968,442 | Clark | July 31, 1934 |
| 2,024,485 | Sussman | Dec. 17, 1935 |
| 2,533,605 | Mueller | Dec. 12, 1950 |
| 2,748,734 | Kennedy | June 5, 1956 |
| 2,782,743 | Kennedy | Feb. 26, 1957 |